United States Patent [19]

Ohyagi

[11] 4,392,135
[45] Jul. 5, 1983

[54] PAGING RECEIVERS

[75] Inventor: Takashi Ohyagi, Tokyo, Japan

[73] Assignee: Nippon Electric Co., Ltd., Tokyo, Japan

[21] Appl. No.: 192,173

[22] Filed: Sep. 29, 1980

[30] Foreign Application Priority Data

Sep. 29, 1979 [JP] Japan .......................... 54-134804[U]
Sep. 29, 1979 [JP] Japan .......................... 54-134806[U]

[51] Int. Cl.³ ...................... H04M 11/02; H04B 1/16
[52] U.S. Cl. .......................... 340/825.44; 340/825.46; 455/34; 455/38; 455/228
[58] Field of Search ................... 455/31, 34, 38, 228; 179/2 EB, 2 EC; 340/825.44, 825.47, 825.48, 311.1, 825.46, 311, 312

[56] References Cited

U.S. PATENT DOCUMENTS 3,846,783 11/1974 Apsell et al. ......................... 455/38
3,976,995 8/1976 Sebestyen ........................... 340/311
4,010,460 3/1977 De Rosa ............................. 340/311
4,196,310 4/1980 Forman et al. .................. 340/149 R
4,249,165 2/1981 Mori ................................... 340/311

*Primary Examiner*—Jin F. Ng
*Attorney, Agent, or Firm*—Charles E. Pfund

[57] ABSTRACT

A paging receiver is provided having an information setter that includes a memory device for storing call numbers assigned the receiver to enable it to determine when it has been individually selected by a radio paging message. In addition to the call numbers, the memory device also stores receiver performance information which selects which of several possible means are used to indicate that a message has been received. A decoder, preferably in the form of a microprocessor, stores information contained by the information setter in a separate register or memory device contained in the decoder. Once the information has been read from the information setter into the decoder it effects control of the receiver's receiving operation, as well as the receiver's selective response to paging messages.

6 Claims, 9 Drawing Figures

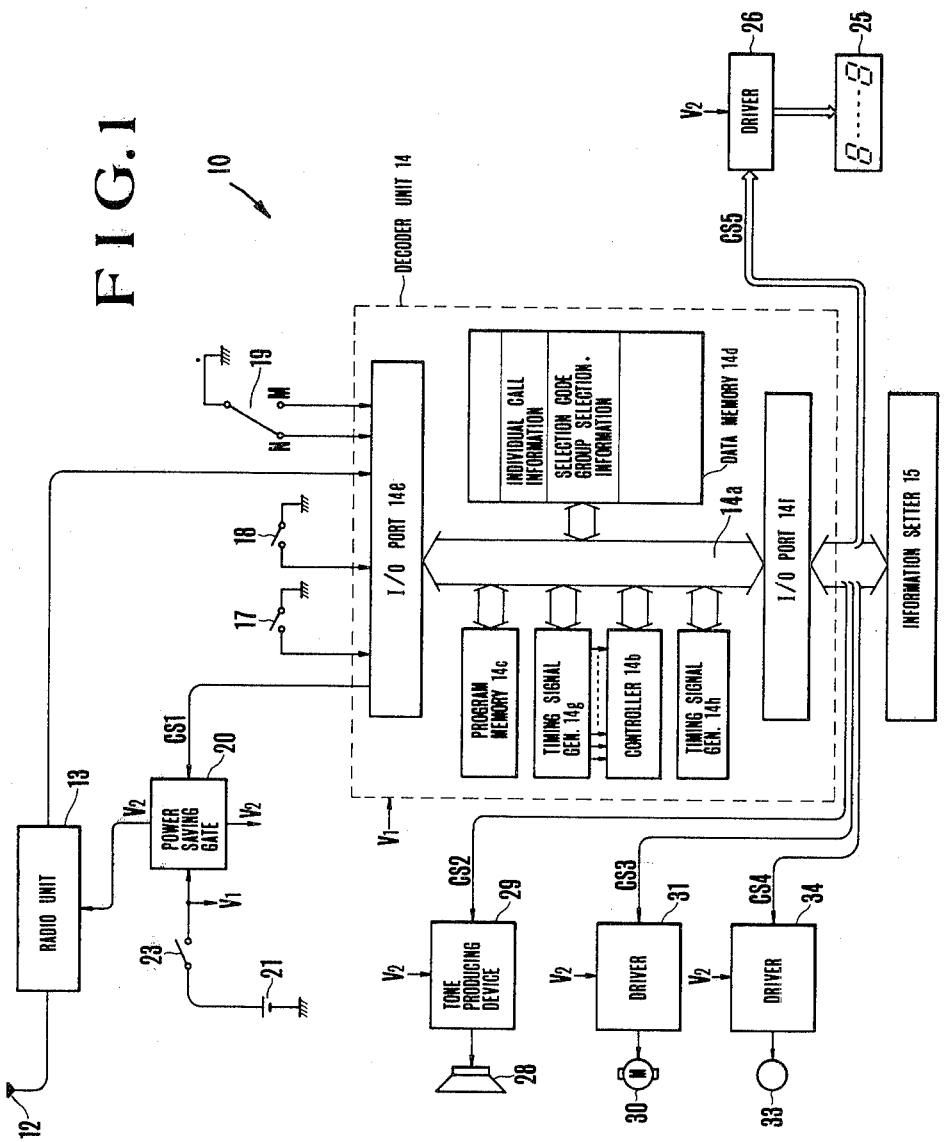

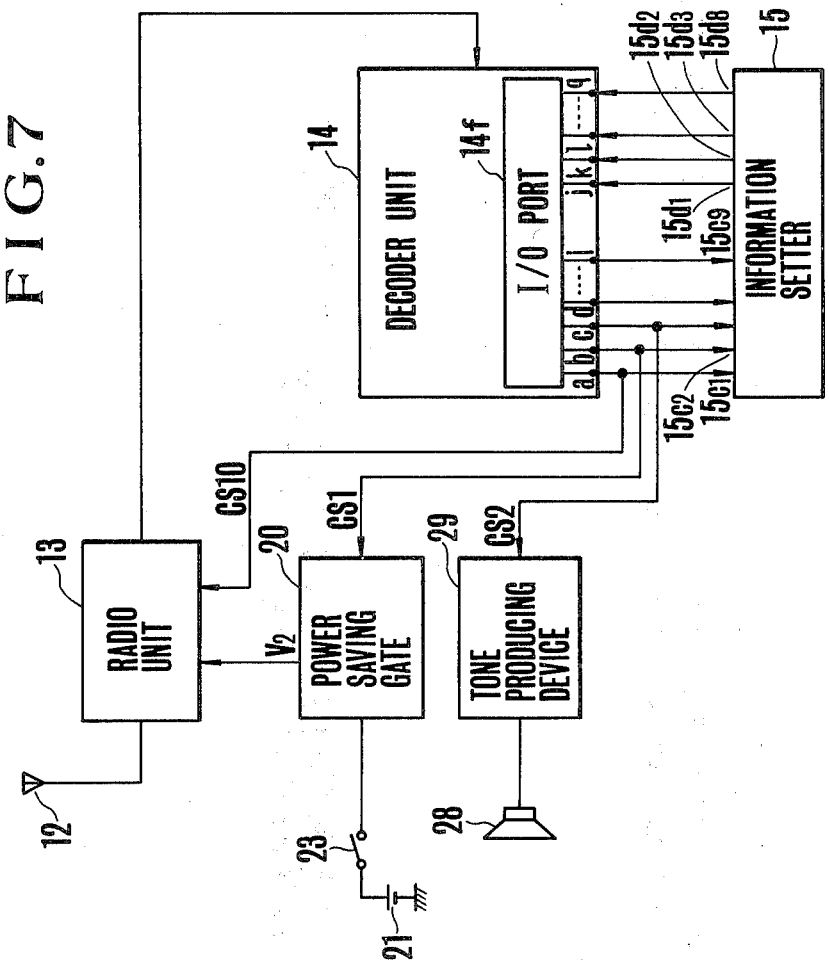

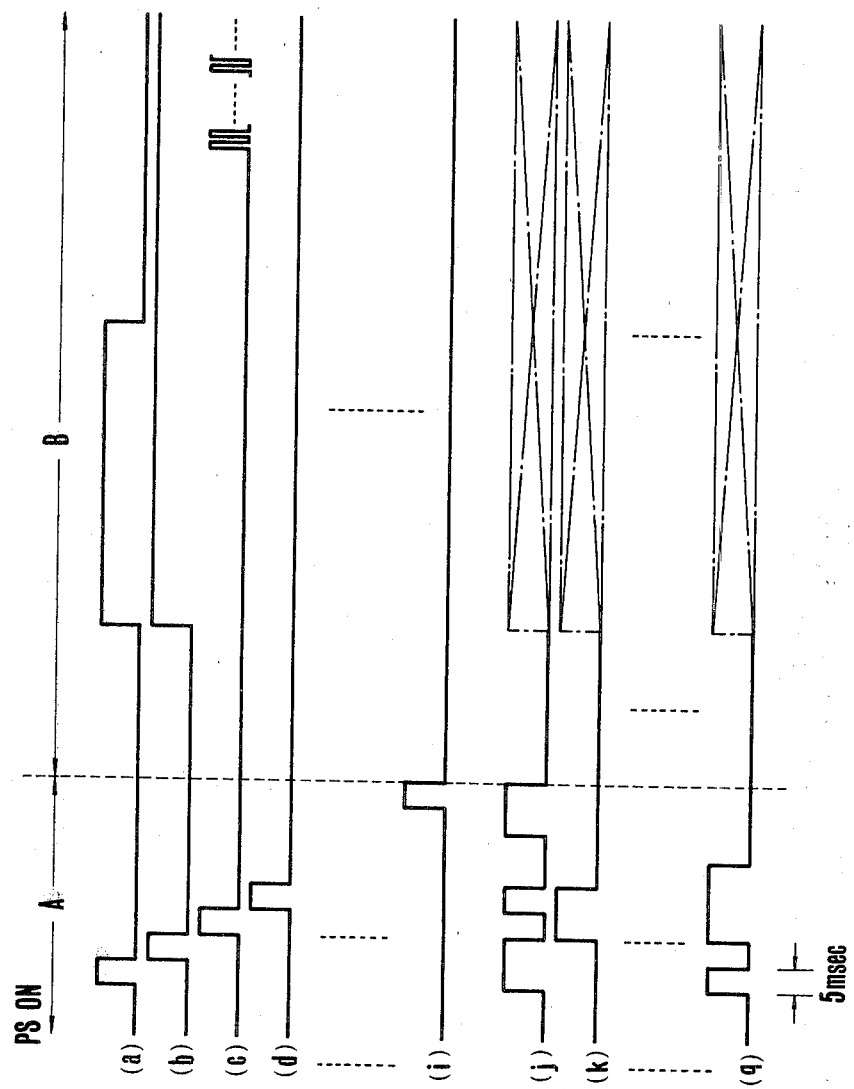

PAGING RECEIVERS

BACKGROUND OF THE INVENTION

This invention relates to paging receivers which can be individually and selectively called by radio signals.

Radio receivers of this type are carried by users and when such a receiver receive radio signals from a central office containing a special code, representing an individual call number assigned to that receiver, the receiver informs its users that he is being paged the user by means of a tone, light or vibration.

Under a special condition, for example, when the user is attending a conference or meeting, he operates a switch to store in a memory device the fact that he has received a radio signal and thereafter the user reads out the content of the memory device to confirm whether be has been paged or not.

Since the receiver is carried by the user, for example in a pocket of a suit, it is desirable to manufacture it as compactly as possible. Prior art receiver was constituted by a radio section which demodulates a radio signal received through an antenna, a call number setting unit that designates a call number, a decoder unit which controls the receiving operation and causes the receiver to respond only to paging messages with the designated call number, and informing or reporting devices which informs the user of a paging message call. Usually, these component elements are fabricated with intergrated circuits. If it is desired to enable a receiver of this construction to operate with a selected set of possible different functional options, it has been common in the prior art to assign each functional option a terminal on the decoder unit for individually determining whether or not that oprtion is selected by means of wiring that terminal either to a high or a low voltage level. Unfortunately, in such a receiver the number of the input terminals of the decoder unit increases with the increase in the number of selectable options, and, when the decoder unit is fabricated with an integrated circuit, it is often necessary to change its design each time the number of the selectable options is increased or changed. An increase in the number of terminals means an increase in the number of contacts to be soldered thus decreasing the reliability of the receiver and making it more difficult to maintain. Moreover, as above described, an increase in the number of the input/output terminals of the decoder unit means an increase of the size of the decoder unit, which runs contrary to the goal of decreasing, as far as possible, the size of the receiver.

SUMMARY OF THE INVENTION

Accordingly, it is an object of this invention to provide a small and compact paging receiver by the use of a decoder unit fabricated with an integrated circuit which has a decreased number of terminals.

Another object of this invention is to provide an individually and selectively callable receiver in which the reliability is increased by decreasing the number of contacts to be soldered.

According to this invention, there is provided a paging receiver comprising an antenna, a radio unit for demodulating a radio signal received by the antenna, an information setter storing information that designates an individually assigned call number, a decoder supplied with an output of the radio unit, and a plurality of informing devices which make reports to a user of the receiver in accordance with decoder outputs. The information setter comprises a first memory device storing the information designating the individually assigned call number and information designating the selection of functional options of said receiver including the selection of which informing devices are to report to a user, and the decoder includes a second memory device for storing information stored in the information setter, enabling the decoder to process the output of the radio unit in accordance with the information stored in the second mentioned memory device.

BRIEF DESCRIPTION OF THE DRAWINGS

These and further objects and advantages of this invention can be more fully understood from the following detailed description taken in conjunction with the accompanying drawings in which:

FIG. 1 is a block diagram showing one embodiment of the paging receiver constructed according to the teaching of this invention;

FIG. 7 is a block diagram showing essential elements of a modified embodiment of the individually and selectively callable receiver according to this invention, and FIG. 8 is a timing chart useful to explain the operation of the modified embodiment shown in FIG. 7.

DESCRIPTION OF THE PREFERRED EMBODIMENT

Figures 2A, 2B:
FIGS. 2A and 2B are charts showing one example of a radio signal received by the receiver shown in FIG. 1 and of the control signal sent out from the decoder unit.

FIG. 1 shows the basic construction of the paging receiver 10 constructed according to this invention which comprises an antenna 12, a radio unit 13 connected to the antenna, a decoder unit 14, an information setting unit 15, function switches 17, 18 and 19 which select or designate functional options, a power or battery saving gate circuit 20, a DC source 21, for example a battery, a source switch 23, a display device 25, a display driver 26, a loudspeaker 28, a tone generating device 29, an electric motor 30, a motor driver 31, a light emitter 33, and a light emitter driver 34, which are connected as shown.

A typical radio signal received by the antenna 12 comprises a preamble signal PS, a succeeding synchronizing signal SYS, a selection code signal, that is an individual call signal SCS, and a message signal MS, which occur in succession as shown in FIG. 2A. In this case, the selection code signal SCS is divided into a plurality of groups thus increasing the number of receivers that can be selected to heat a given message and improving the receivers power saving characteristics.

The radio unit 13 functions to demodulate the radio signal received by the antenna 12, and each time a control signal CS1 is applied to the power saving gate circuit 20 from the decoder unit 14 at the time T1 showing in FIG. 2B, the source voltage V2 is applied to the radio unit 13 as will be described later in more detail, so that the radio unit becomes operative to effect demodulation.

When supplied with the control signal CS1, the power saving gate circuit 20 applies the source voltage V2 to the tone producing device 29 and to respective drivers 26, 31 and 34.

As shown, the decoder unit 14 is constituted by a microprocessor or a microcomputer and includes a controller 14b, a program memory device 14c, a data memory device 14d, I/O ports 14e and 14f and timing signal generator 14g and 14h which are interconnected through a bus line 14a. Upon closure of the source switch 23, the source voltage V1 is constantly applied to the decoder unit 14 from the source 21 to maintain the decoder unit in the operative condition. As is well known in the art, the controller 14b forms the essential portion of the microprocessor, enabling that microprocessor to execute various operations under the control of the controller 14b. The program memory device 14c stores a program to be processed by the decoder unit 14, the detail of the content of the program being shown in the flow charts shown in FIGS. 4, 5 and 6, as will be described later.

The timing signal generator 14g generates various timing signals necessary to operate various elements of the decoder unit 14. These timing signals are sent to the controller 14b and other elements through the bus line 14a.

The other timing signal generator 14h generates a timing pulse which is synchronized with the synchronizing signal SYS contained in the radio signal so as to cause the controller 14b to operate synchronously with the radio signal received by radio unit 13.

The data memory device 14d functions as a temporal memory device or a register and is utilized to store or count such external signals, as for example, individual call number digits supplied from the radio unit 13, individual call number digits supplied from the information setter 15, and the functional option selection information of the receiver, including signals for designating the mode of signal reception and for selecting the informing means used for informing the user of a paging message.

The I/O ports 14e and 14f are used as interfaces between the decoder unit 14 and outside elements. Although in this example, two I/O ports are shown, a single port may be used. The input terminals of the I/O port 14e received the output signal from the radio unit 13, and output signals of the function switches, which include an alarm reset switch 17, a memory read out switch 18 and a switch 19 for selecting between either alert processing or a vibrating processing and alert memory processing. When the switch 19 is thrown to a contact N alert processing is selected, whereas when it thrown to a contact M vibration processing or alert memory processing is selected. This I/O port 14e is provided with an output terminal for sending out a control signal CS1 to the power saving gate circuit 20.

The I/O port 14f is provided with output terminals for supplying signals to the information setter 15, the drivers 26, 31 and 34 and to the tone producing device 29, and it is provided with an input terminal for receiving the output signals of the information setter 15.

The decoder unit 14 performs the following four fundamental operations.

(a) Initializing operation

This operation is performed according to the program of the program memory device 14c concurrently with the closure of the source switch 23. At first, a preamble receiving flag and an individual call number receiving flag necessary to the input-output operations of the decoder unit 14 are reset. At the same time an area for storing the received data, that is, information from the radio unit 13 or other input, and an area for storing signals to be sent to such information devices as the display device 25, the loudspeaker 28, the motor 30, and the light emitter 33 are initially set.

(b) Reading out informations from the information setter 15

As will be described in detail later, the information setter 15 is accessed to read out the individual call numbers, the functional option selection information, etc., so as to store this read out information in the data memory device 14d.

(c) Power saving operation

As will be described later in detail, normally the source voltage is supplied only to a minimum number of component elements, and the source voltage is supplied to the informing devices and other elements only when the individual call signal of the receiver is received or when otherwise desired, thus saving power. In this example, the decoder unit 14 is supplied with the source voltage V1 at the same time as the closure of the source switch. Further, at least the radio unit 13 is periodically supplied with the source voltage for checking the presence or absence of the radio signal.

(d) Receiving and informing operations

As will be described later, the output of the radio unit 13 is periodically checked, and upon receipt of the radio signal the synchronizing signal SYS is extracted, and in synchronism therewith a check is made as to whether the individual call number signal received is the assigned to the receiver or not. When the received signal is assigned to the receiver the user is informed according to a selected functional option or the signal is stored in the memory device for future information.

Figure 3:
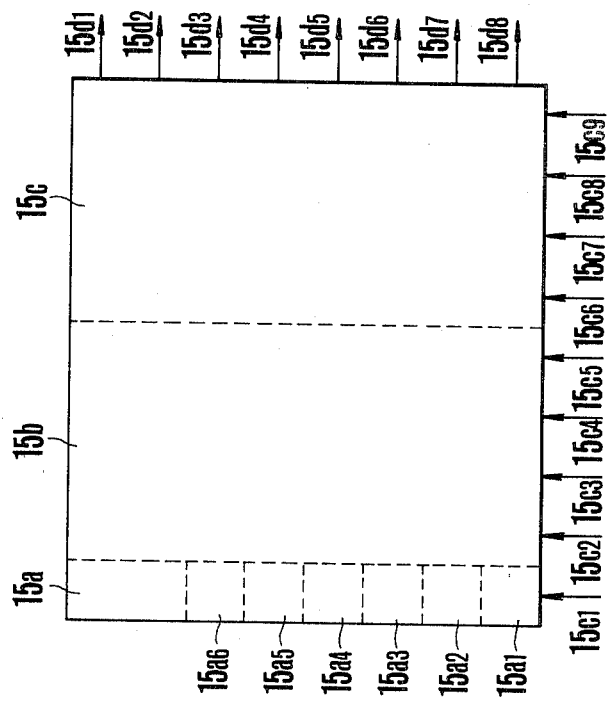
FIG. 3 shows one example of a memory map of the information setting unit shown in FIG. 1.

The information setter 15 is constituted by a read only memory device (ROM) or a programmable memory device such as a PROM, and the read out information is sent to the decoder unit 14 and is sequentially stored in predetermined areas of the data memory device 14d. The information setter 15 stores information according to the memory map shown in FIG. 3, for example. More particularly, the information setter 15 comprises an ROM having a matrix construction of $8 \times 9$ bits. The ROM has a memory area 15a for the functional option selection information which selects various functional options of the receiver, an areas 15b and 15c for storing the call number information assigned to the receiver, input terminals $15_{c1}$ through $15_{c9}$ for receiving address signals from the decoder unit 14, and information output terminals $15d1$ through $15d8$. In this example, in the functional option selection storing area 15a, there is are provided an automatic reset performance designation bit $15_{a1}$, a memory performance designation bit $15_{a2}$, a vibrator performance designation bit $15_{a3}$, a display performance designation bit $15_{a4}$, and a signal receiving mode designation bit $15_{a5}$.

When the automatic reset performance bit $15_{a1}$ is set to "0" for example, no automatic reset processing is performed. Accordingly, at this time the informing processing would not be terminal until manual operation of the switch 17. When this bit is "1", the informing operation is performed for a definite time and then automatically terminated.

When the memory performance designation bit $15_{a2}$ is set to "1", an alert memory storing operation is performed, whereas when this bit is set to "0" this memory operation is not performed.

When the vibrator performance designation bit $15_{a3}$ is set to "1" vibration processing is performed whereas when this bit is set to "0" this vibration performance is omitted. In the embodiment shown memory performance and vibration performance can not be selected at the same time.

When the display performance designation bit $15_{a4}$ is set to "1" display processing is effected, whereas when it is set to "0" no display performance is effected. In the embodiment shown, this processing is effected concurrently with the tone producing processing or the read out processing of the alert memory device.

When the signal receiving mode designation bit $15_{a5}$ is set to "1", a battery or power saving processing is performed, whereas when it is set to "0" the source voltage is continually applied to various circuit elements of the receiver. In this embodiment, the description is made on the assumption that the receiver has the battery saving performance selected.

The call number information is made up of selection code group designation information $15b$ and individual call number designation information $15c$.

The reading out of the functional option selection information and the call number information is performed following the initializing operation of the decoder unit 14. As has been pointed out before, the decoder unit 14 performs the functional option selection operation (to be described later) in accordance with the functional option selection information stored in the data memory device 14d. The setting of information into the information setter 15 is made at the time of shipping of the receiver or at any desired time by well known means.

The display device 25 may be of the liquid crystal type, for example, and it operates to display telephone numbers, digits, street names, cryptograph codes, etc., according to messages MS sent subsequent to the selection code SCS of the radio signal shown in FIG. 2. This information is sent to the driver 26 from the decoder unit 14 as a control signal CS5 and displayed.

The loudspeaker 28 functions inform to the user that an individual call has been made when the switch 19 is thrown to contact N. When the control signal CS2 is sent to the tone producing device 29 from the decoder unit 14, an oscillator contained in the tone producing device oscillates to apply its output to the loudspeaker 28.

When the switch 19 is thrown to contact M and when the functional option information sent from the information setter 15 contain a vibration selecting bit, the motor 30 rotates when a control signal CS3 is sent to the driver 31 from the decoder unit 14 to vibrate the receiver and inform the user of the fact that the user is being called.

The light emitter 33 is made up of a luminous diode, for example, and it is lighted when the driver 34 receives a control signal from the decoder unit 14. The light emitter 33 is operated simultaneously with both the ringing of the loudspeaker 28 and the rotation of the motor 30 in a response to a control signal CS4 sent from the decoder unit 14, in conjunction with either control signal CS2 or CS3. Thus in the flow charts shown in FIGS. 4 through 6 it is to be understood that when either the loudspeaker 28 or the motor 30 are operated, the light 33 is also operated.

When the source switch 23 is closed, the decoder unit 14 is supplied with the source voltage V1 to become operative for transferring call number information and the functional option selection information stored in the information setter 15 to the data memory device 14d and for effecting various other initializing operations. The decoder unit 14 sequentially operates in accordance with the instructions stored in the program memory device 14c, that is according to the flow charts shown in FIGS. 4 and 5.

Figure 4:
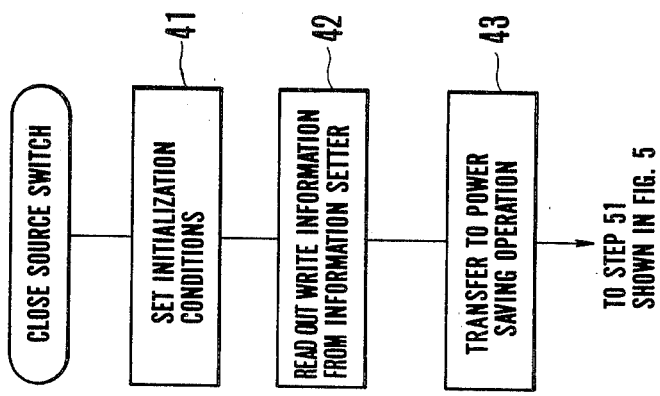
FIGS. 4 through 6 show flow charts useful to explain the operation of the receiver shown in FIG. 1.
Figure 5:
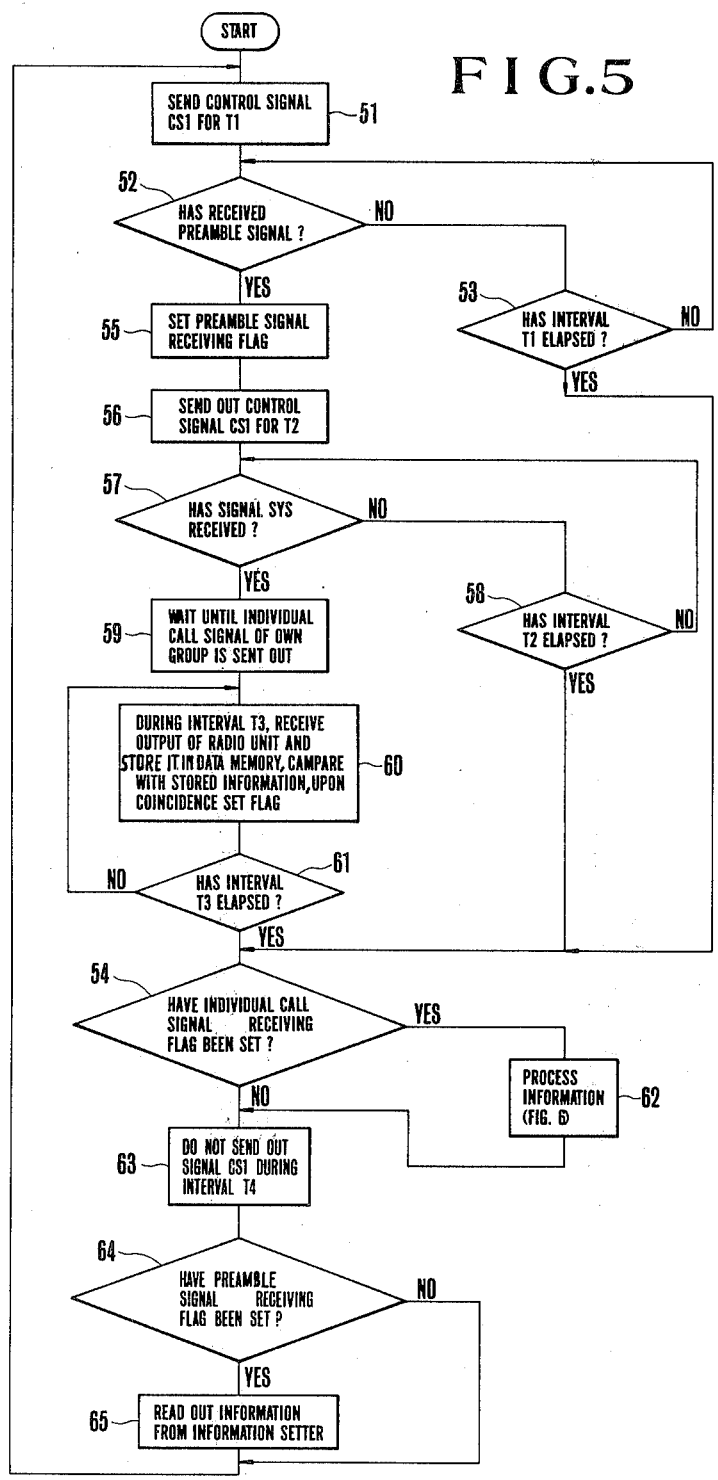

Now the operation of the individually and selectively callable receiver will be described with reference to the flow charts shown in FIGS. 4, 5 and 6.

Upon closure of the source switch 23, the decoder unit 14 is supplied with source voltage V1. Then the program is advanced to step 41, shown in FIG. 4, to set initializing conditions of various elements described above, and then advanced to step 42, where the decoder unit 14 accesses the information setter 15 according to a program stored in the program memory device 14c to read out call number information assigned to a given receiver and the functional option selection information of the receiver, including the designation of the receiver's signal receiving mode and the selection of the informing means which are to inform a user of a message.

Then the program is advanced to step 43 which transfers the receiver to the power saving mode of operation.

At step 51 (see FIG. 5) the decoder unit 14 sends to the power saving gate unit 20 a control signal CS1 for an interval T1 shown in FIG. 2B, for turning on the power source of the radio unit 13 for the interval T1 so that radio unit 13 is in an operative state during this interval. Then at step 52, the decoder unit 14 checks whether the output of the radio unit 13 received via I/O port 14e contains the preamble signal or not. When the preamble signal is not contained within the output of the radio unit 13, the program is advanced to step 53, which repeatedly returns the program back to step 52 to again check whether or not the output of the radio unit 13 contains the preamble signal until the interval T1 has elapsed. Where there is no preamble signal during the interval T1, step 53 advances the program to step 54, whereas when the preamble signal is contained in the output of the radio unit 13, the program is advanced to step 55 to set a flag showing that the preamble signal was received and then to step 56 to send out the control signal CS1 for an interval T2 longer than interval T1 to prepare for the reception of a synchronizing signal SYS following the preamble signal.

Then the program is advanced to step 57 to check whether the synchronizing signal SYS has been received or not as the output of the radio unit 13. If the synchronizing signal SYS is not received, the program advances to step 58 where a check is made as to whether the interval T2 has elapsed or not, and when the result of the check is NO the program is returned back to step 57 to check again whether the synchronizing signal SYS has been received or not. If the synchronizing signal SYS is not received during the interval T2, the step 58 advanced the program to step 54.

Where the synchronizing signal SYS is received during the interval T2, the program is stopped at step 59 to wait until the selection code group, a designated by the selection code group designation information $15b$, is due to be transmitted. During the waiting time, the sending out of the control signal CS1 to the power saving gate circuit 20 is interrupted as can be noted from the waveform shown in FIG. 2B.

When it is time for section code group (in this example, group 3 associated with the individual call number assigned to the given receiver to be sent, the program is advanced to step 60, which sends the control signal CS1 to the power saving gate circuit 20, an interval T3 for turning on the power source of the radio unit 13. The output of the radio unit 13 is inputted to the data memory device 14d, where it is compared with with the individual call number transferred from the information setter 15. When a coincidence is obtained, a flag showing the reception of the individual call signal is set and the program is then advanced to step 61. When the coincidence is not obtained, the program is immediately advanced to step 61 where a confirmation is made as to whether the interval T3 has elapsed or not, and if the result is NO the program is returned to step 60 to repeat again the operations described above.

Once the interval T3 has elapsed, the program is transferred to step 54 where a check is made as to whether the individual call number receiving flag has been set or not.

When the flag is set the program is advanced to step 62 to process the information of the paging message and then the program is advanced to step 63. The information processing will be described later with reference to FIG. 6. When the flag is not set, the program is immediately advanced to stop 63, at which the decoder unit 14 stops the sending out of the control signal CS1 for interval T4. Then at step 64 a judgement is made as to whether the preamble signal receiving flag has been set or not. If the result of judgement is YES, at step 65, information is again read out from the information setter 15 and thereafter the program is transferred to step 51. This reading out operation is identical to the operation wherein the functional option selection information and the individual call number information are read out from the information setter at the time of initializing the decoder unit 14, with the read out information being stored in the data memory device 14d. If the preamble signal receiving flag has not been set the program is returned to step 51 to repeat above described operations.

Figure 6:
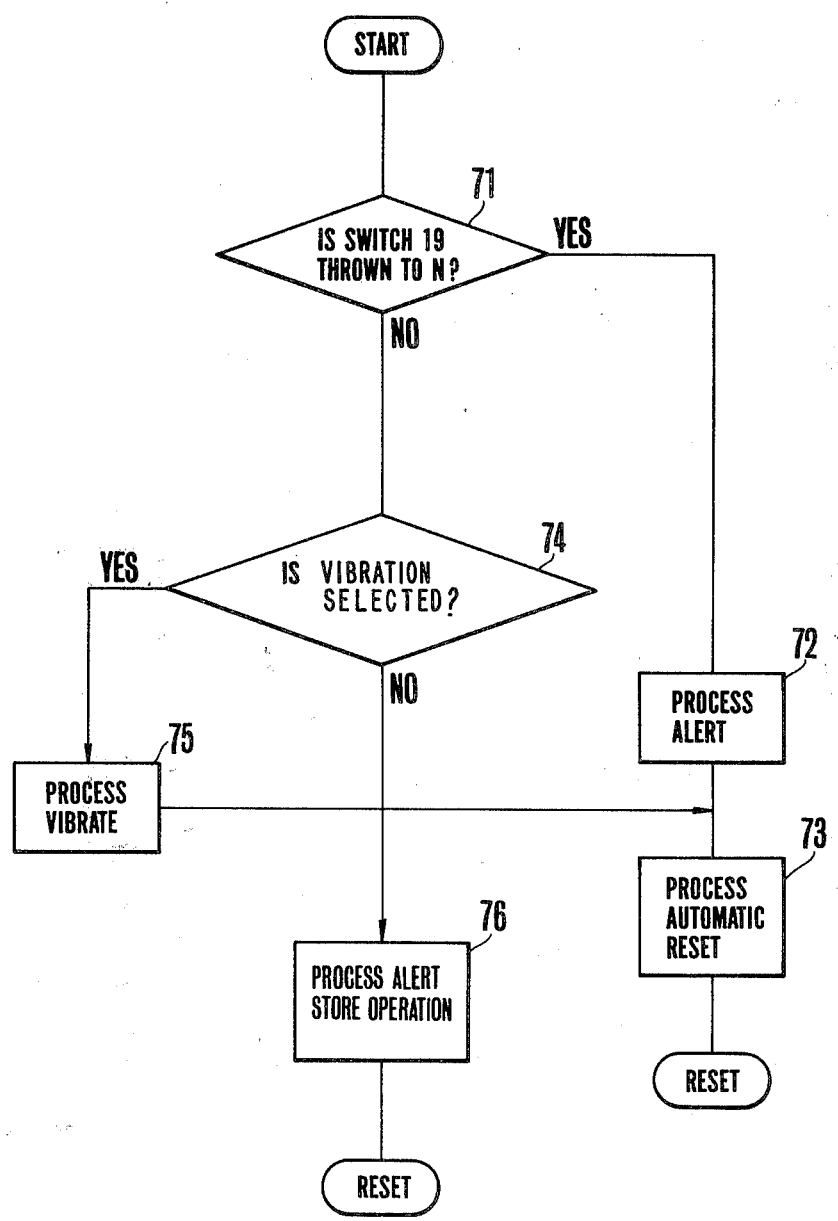

FIG. 6 is a flow chart showing one possible example of the information processing step 62. When the individual call number receiving flag has been set, the program is advanced to step 71 where a judgement is made whether switch 19 has been thrown to contact N or not. When the result of judgement is YES, the program advances to step 72 when alert processing is executed. In other words, a control signal CS2 is sent to the tone producing device 29 to cause the loudspeaker 28 to produce a tone. At the same time driver 26 is energized to display the message on the dislay device 25. Upon completion of the processing described above the program is advanced to the next step 73.

When the switch 19 has been thrown to contact M instead of contact N, the program is advanced to step 74 where a judgement is made whether the functional option selection information read out from the information setter 15 selected vibration or not. If the result is YES, the program is advanced to step 75 to execute the vibration processing. At this time, the decoder 14 sends a control signal CS3 to the driver 31 to drive the motor 30.

After either step 72 or 75 program advances to step 73 where automatic reset processing is executed according to the functional option selection information once a predetermined time, for example 8 seconds, has elapsed after completion of the processing at either step 72 or 75. In step 73, the sending out of the control signal CS2 or CS3 is stopped. Then the program is advanced to the next step 63.

If step 74 determines that vibration processing has not been selected, the program advances to step 76, in which the output of the radio unit 13 is not sent out to an informing device, but is continuously stored.

Although not shown in the drawing, when the user closes the switch 18, the decoder unit 14 reads out the report information stored in the data memory device 14d to drive the tone producing device 29 and/or the driver 26 to produce a tone from the loudspeaker or to display the information on the display device 25.

When the user closes switch 17 during the alert processing at step 72 or the vibration processing at step 75, the decoder unit 14 stops the sending out of the control signals and the program is advanced to step 63.

As above described, the designation of the signal receiving mode, and selection of the reporting means as well as the performance of the receiver are written into a memory element as the functional option selection information and this information is set in the decoder unit so as to select the performance of the receiver, so that it is not necessary to provide discrete terminals for for selecting various possible functional options as in prior art receivers. Thus, it is possible to decrease the size of the receiver irrespective of the increase in selectable options of the receiver. Especially, the number of the terminals of the decoder unit may be small as that of a commercial microprocessor. Moreover, the functional options of the receiver may be changed by merely exchanging an element of the functional option selection information.

FIG. 7 illustrates a modified embodiment of the paging receiver according to this invention in which elements corresponding to those shown in FIG. 1 are designated by the same reference numbers. In this modification, terminals connecting the I/O port 14f of the decoder unit 14 to the information setter 15 are also used as the output terminals for sending control signals from the decoder unit 14 to other elements. Thus, in this embodiment, the 15$_{c2}$ of the information setter 15, or the input terminal b of the I/O port 14f, is used as the output terminal for sending a control signal CS1 to the power saving gate circuit 20, whereas the input terminal 15$_{c3}$ (output terminal c) is used as the output terminal for sending out a control signal CS2 to the tone generating device 29 which actuates the loudspeaker 28. The input terminal 15$_{c1}$ of the information setter 15 (input terminal a of the I/O port 14f is used as the output terminal for sending out a control signl CS10 to the radio unit 13, which, in response to this control signal CS10, increases the time constant on the output side of a demodulator, not shown, for the purpose of shaping the waveform of the demodulated radio signal.

In FIG. 8, curves a through q show waveforms at corresponding input/output terminals shown in FIG. 7. A region A, shown in FIG. 8, shows the signal waveform during the time that information is read out from the information setter 15 into a memory within decoder 14, whereas a region B shows the signal waveform at the time of reception of a paging message.

With the circuit shown in FIG. 7, closure of a source switch 23 applies a source voltage to the decoder unit 14 from a power source 21. Then the decoder unit 14 undergoes an initialization process as has been described in detail with reference to the previous embodiment, and then reads out the content of the information setter 15 before commencing the receiving operation. The information setter 15 is constructed as a matrix having 8 rows and 9 columns and read out pulses are applied to the columns for reading out the contents of the rows. More particularly, the output terminals a through i of the decoder unit 14 each produce a single read out pulse a through i, respectively, in the region A shown in FIG. 7. These read out pulses have a width of 5 ms at the output terminals a through i. The 5 ms. read out pulses produced on output terminals a and b are too brief to have any significant effect upon the radio unit 13 or the power saving gate 20 to which those terminals are connected, respectively. The output from the output terminal c is connected the loudspeaker 28 via the tone producing device 29. However, the 5 ms. read out pulse produced at terminal C does not cause a ringing tone to be produced by the loudspeaker because the bandpass characteristic of the loudspeaker 28 are such that it does not respond to such a single pulse. In the region A, the output terminals a through c operate as the read out pulse outputting terminals for reading out the content of the information setter 15 just in the same manner as other output terminals d through i thereby causing information to be read out from the information setter 15 through input terminals j through q.

This writing operation is completed in about 45 ms and then the receiving operation corresponding to a region B shown in FIG. 8 is commenced. To perform this receiving operation control signals are outputted from the same output terminals a through c. More particularly, the code construction of a synchronizing signal obtained by demodulating a radio signal applied to the decoder 14 from antenna 12 via the radio unit 13 differ greatly, so that after receiving the synchronizing signal the output terminal a produces a control signal utilized to receive a call signal, while the output terminal b supplies a signal to power saving gate circuit 20 for saving power. When a signal output from the radio unit 13 is decoded by the decoder unit 14 and the decoded signal coincides with a number read out from the information setter 15, the output terminal c produces a signal having a frequency of about 2.0 KHz which is used to produce a ringing tone from the loudspeaker 28 via the tone producing device 29. The output terminals a through c not only send out control signals to various elements for receiving the call signal but also, as is described above, send out read out pulses to the information setter 15 so that the contents of the information setter 15 are sent to input terminals j through q. However, in the region B, the decoder unit 14 would not misoperate because during that period no data is written into it memory from the input terminals j through q.

As above described in this embodiment, a single control signal line is commonly used for passing control signals from the decoder unit to respective element to be controlled by the decoder unit and for passing read out signals from the decoder unit to the information setter for reading out call numbers and the read out signals and the control signals are sent, on a time division basis, on a common signal line. Consequently, it is possible to use a single terminal at the output of the decoder unit as both a control terminal and a read out terminal, thereby decreasing the number of the output terminals of the decoder unit which improves the reliability and reduces the size of the decoder unit.

Having described specific embodiments of our invention it is believed obvious that modification and variation of our invention is possible in light of the above teachings.

For example, although in FIG. 1 power for the information devices is supplied through the power saving gate 20, the source voltage V1 could be supplied to those information devices directly.

Further, although in FIG. 2A the message signal MS of the radio signal follows all the selection code groups, it could follow a particular selection code group with which it is to be associated.

What is claimed is:

1. A paging receiver comprising:
   an antenna;
   a radio unit for demodulating a radio signal received by said antenna;
   an information setter storing information that designates an individually assigned call number;
   a decoder supplied with the output of said radio unit; and
   a plurality of informing devices which make reports to a user of said receiver in accordance with decoder outputs;
   said information setter comprising a first memory device storing said information designating said individually assigned call number and information designating the selection of functional options of said receiver including the selection of which of said informing devices make reports to said user; and
   said decoder including a second memory device for storing information stored in said information setter, enabling said decoder to process the output of said radio unit in accordance with the information stored in said second memory device.

2. The receiver according to claim 1 wherein said functional option selection information comprises automatic reset performance information for terminating said reports after a predetermined time, memory performance information for temporarily storing received radio signals, display performance information for displaying messages contained in the received radio signal, information for displaying with light said reports, vibration performance information for informing the user of said reports by vibrations or information for informing the user of the reports by tone production.

3. The receiver according to claim 1 or 2 wherein said decoder comprises a microprocessor.

4. The receiver according to claim 1 wherein said information setter comprises a plurality of input/output terminals connected between said decoder and said information setter for reading out information from said information setter, at least one of said input/output terminals also being used to send out device control signals the information read out from said information setter and said device control signals being sent at different times.

5. The receiver according to claim 4 wherein said device control signals are supplied to said informing devices.

6. The receiver according to claim 4 wherein one of said device control signals is supplied to said radio unit.

* * * * *

UNITED STATES PATENT AND TRADEMARK OFFICE
CERTIFICATE OF CORRECTION

PATENT NO. : 4,392,135
DATED : July 5, 1983
INVENTOR(S) : Takashi Ohyagi

It is certified that error appears in the above—identified patent and that said Letters Patent is hereby corrected as shown below:

Col. 1, lines 11,12: change "being paged the user by means" to --being paged by means--
Col. 1, line 21: change "receiver was" to --receivers have been--
Col. 1, line 28: change "informs the user of a paging message call." to --inform the user of a paging message.--
Col. 1, line 35: change "oprtion" to --option--
Col. 2, line 55: change "heat" to --hear--
Col. 4, line 6: change "informations" to --information--
Col. 4, line 33-34: change "is the assigned to the receiver or not." to --is the individual call number assigned--
Col. 4, line 55: change "there is are" to -- there is--
Col. 4, line 63: change "terminal" to --terminated--
Col. 5, line 43: change "functions inform to the user" to --functions to inform the user--
Col. 6, lines 57,58: change "T2, the step 58 advanced the program" to-- T2, step 58 advances the program--

UNITED STATES PATENT AND TRADEMARK OFFICE
CERTIFICATE OF CORRECTION

PATENT NO. : 4,392,135

DATED : July 5, 1983

INVENTOR(S) : Takashi Ohyagi

It is certified that error appears in the above—identified patent and that said Letters Patent is hereby corrected as shown below:

Col. 6, line 61: change "group, a designated" to --group, designated--

Col. 6, line 68: change ",group 3 associated" to --, group 3) associated--

Col. 7, line 3: change "20, an interval T3 for turning" to --20 for an interval T3, turning--

Col. 7, line 47: change "step 72 when" to --step 72 where--

Col. 8, line 23: cancel "for"

Col. 8, line 41: change "embodiment, the $15_C2$" to --embodiment, the input terminal $15_C2$--

Signed and Sealed this

Twenty-second Day of May 1984

[SEAL]

Attest:

GERALD J. MOSSINGHOFF

Attesting Officer    Commissioner of Patents and Trademarks